US008488271B2

(12) United States Patent
Tashiro et al.

(10) Patent No.: US 8,488,271 B2
(45) Date of Patent: Jul. 16, 2013

(54) ADHESION STRUCTURE AND METHOD USING ELECTRICALLY CONDUCTIVE ADHESIVE, DISK DRIVE DEVICE USING THE ADHESION STRUCTURE AND METHOD, AND METHOD FOR MANUFACTURING THE DISK DRIVE DEVICE

(75) Inventors: Tomoyuki Tashiro, Shizuoka (JP); Akikazu Shibata, Shizuoka (JP)

(73) Assignee: Samsung Electro-Mechanics Japan Advanced Technology Co., Ltd., Shizuoka (JP)

( * ) Notice: Subject to any disclaimer, the term of this patent is extended or adjusted under 35 U.S.C. 154(b) by 501 days.

(21) Appl. No.: 12/497,848

(22) Filed: Jul. 6, 2009

(65) Prior Publication Data

US 2011/0002212 A1      Jan. 6, 2011

(51) Int. Cl.
*G11B 33/02* (2006.01)
*G11B 33/12* (2006.01)

(52) U.S. Cl.
USPC .................................. 360/99.16; 360/99.15

(58) Field of Classification Search
USPC .......... 360/97.01–97.03, 99.08, 98.07, 97.12, 360/99.15, 99.16; 252/512, 514
See application file for complete search history.

(56) References Cited

U.S. PATENT DOCUMENTS

| 4,428,867 | A | * | 1/1984 | Billias et al. | 252/512 |
| 4,735,847 | A | * | 4/1988 | Fujiwara et al. | 428/209 |
| 5,741,430 | A | * | 4/1998 | Dahringer et al. | 216/34 |
| 6,514,433 | B1 | * | 2/2003 | Takeichi et al. | 252/512 |
| 6,884,833 | B2 | * | 4/2005 | Chheang et al. | 524/445 |
| 7,524,893 | B2 | * | 4/2009 | Terada et al. | 523/457 |
| 2002/0158232 | A1 | * | 10/2002 | Mitani et al. | 252/500 |
| 2002/0197399 | A1 | * | 12/2002 | Date et al. | 427/213.33 |
| 2005/0172483 | A1 | * | 8/2005 | Sugita et al. | 29/830 |
| 2008/0099121 | A1 | * | 5/2008 | Oka et al. | 156/48 |

FOREIGN PATENT DOCUMENTS

| JP | 56055439 | A | * | 5/1981 |
| JP | 10-56254 | | | 2/1998 |
| JP | 2000-8016 | | | 1/2000 |
| JP | 2001-107267 | | | 4/2001 |
| JP | 2004-289982 | | | 10/2004 |
| JP | 2005317351 | A | * | 11/2005 |
| JP | 2006100170 | A | * | 4/2006 |

OTHER PUBLICATIONS

English-machine translation of JP 2004-289982 A, to Yajima, published on Oct. 14, 2004.*

* cited by examiner

*Primary Examiner* — Will J Klimowicz
(74) *Attorney, Agent, or Firm* — Fulwider Patton LLP

(57) ABSTRACT

A base plate containing aluminum as a main component and an electrically conductive counter plate are bonded together through the medium of an electrically conductive adhesive. Even when an oxide film is formed on the surface of the base plate, electrical continuity between the base plate and the counter plate, which are connected together through the medium of the electrically conductive adhesive, is improved by a process of applying a resistance lowering voltage, which reduces the resistance component due to the oxide film by causing a dielectric breakdown.

9 Claims, 7 Drawing Sheets

ADHESION STRUCTURE AND METHOD USING ELECTRICALLY CONDUCTIVE ADHESIVE, DISK DRIVE DEVICE USING THE ADHESION STRUCTURE AND METHOD, AND METHOD FOR MANUFACTURING THE DISK DRIVE DEVICE

CROSS-REFERENCES TO RELATED APPLICATIONS

Background

1. Field of the Invention

The present invention relates to an adhesion structure, an adhesion method, a disk drive device, and a method for manufacturing the disk drive device. In particular, the invention relates to an adhesion structure and method using an electrically conductive adhesive, a disk drive device using the adhesion structure and method, and a method for manufacturing the disk drive device.

2. Description of the Related Art

In recent years, there have been rapid advances in technology for increasing the recording density of fixed disk drive devices (hereinafter referred to simply as disk drive devices), which have resulted in a marked boost in expanding the recording capacity. In such disk drive devices, data are recorded magnetically on a rapidly spinning recording disk. A problem with such a recording disk is that it is sometimes subject to electrostatic charging because of its high-speed rotation in air. And the recording disk charged with much static electricity can cause a discharge breakdown of the magnetic head or a destruction of data recorded on the recording disk. To prevent such electrostatic charging of a recording disk, the disk drive device must be provided with conducting paths for grounding static charges occurring in the recording disk. Normally, a disk drive device is comprised of such components as a hub for supporting a recording disk, a shaft securing the hub, a sleeve holding the shaft, and a base plate (sometimes called a motor base) holding a part of the sleeve, and these components can each be formed of an electrically conductive material. Thus, conducting paths that discharge static charges in a recording disk may be created by, for instance, electrically connecting the hub, which supports the recording disk, the shaft and the base plate.

Electrical continuity through the component members may be assured by direct contact between them. For the components that require a strong bond, e.g., in the joining of the sleeve to the base plate, however, it is necessary to select a reliable bonding method. Press-fitting may be a possible method when, as with the sleeve and the base plate, one part is inserted into an opening in the other to be firmly locked together. Yet, the sleeve is a component that holds the shaft rotatably with a clearance of only several micrometers, and it must be protected against any external causes of deformation. For such components, therefore, press-fitting that can apply large external forces is not desirable. Accordingly, a method of bonding often used conventionally has been such that the sleeve and the base plate are combined in a state of clearance fit and an adhesive is introduced in the gap therebetween. With such a method, however, there has been a problem that electrical continuity can be obstructed by the presence of an adhesive between the sleeve and the base plate. While caulking, welding, or soldering may be employed as a method for ensuring electrical continuity between the sleeve and the base plate, such an operation may cause a large external force or excessive heat, which can deform the parts involved.

As a way of resolving the above-described problem, an adhesion method using an electrically conductive adhesive that can assure electrical continuity is disclosed in Japanese Patent Application Publication No. 2004-289982.

Note that the base plate, which is one of the adherends of the electrically conductive adhesive, is, for example, formed through some additional processes on an aluminum die casting in consideration of required workability, strength, corrosion resistance, dimensional accuracy, and so forth. Aluminum excels in corrosion resistance because of an oxide film that can easily form on its surface. However, when electrical continuity must be assured with another object in contact with it, there arises a problem of the oxide film interfering with the electrical continuity. Hence, some countermeasure to the oxide film must be taken if electrical continuity is to be provided in the use of an electrically conductive adhesive. And there are, in fact, a number of known countermeasures.

For example, in a method disclosed in Japanese Patent Application Publication No. Hei10-56254, electrical continuity is improved by having a filler penetrate into the oxide film through heating and pressurization during the curing of the electrically conductive adhesive. However, this method has a problem of inferior workability because pressures cannot often be applied during the curing of the adhesive depending on the application position of the adhesive. Also, in a method disclosed in Japanese Patent Application Publication No. 2000-8016, interference by the oxide film is reduced by the use of an electrically conductive adhesive containing an activator capable of removing the oxide film. In this case, however, the presence in the adhesive of components that have nothing to do with adhesion can affect the curing performance, creating other problems such as longer curing time or outgassing after the curing. And these other problems require additional measures to prevent them. Further, in a method disclosed in Japanese Patent Application Publication No. 2001-107267, electrical continuity is improved by raising the probability of contact between fillers themselves by an application of the electrically conductive adhesive in an electric field. In this case, the curing of the electrically conductive adhesive does not end in a short period of time, but normally takes 30 minutes or longer. As a result, the adhesive can flow during the process of curing, and simply applying an electric field during the application of the adhesive does not guarantee a raised probability of contact between fillers themselves after the curing. Besides, a specially designed large-scale equipment is required to realize the application of an electric field constantly during a long process of curing, and thus this process is not suited to mass production.

SUMMARY OF THE INVENTION

The present invention has been made in view of the foregoing circumstances, and a purpose thereof is to provide an adhesion structure using an electrically conductive adhesive capable of assuring electrical continuity with an adherend without obstruction from an oxide film, a disk drive device using the adhesion method and structure, and a method for manufacturing a disk drive device employing the adhesion method.

To resolve the foregoing problems, an adhesion structure according to an embodiment of the present invention includes: an electrically conductive member containing aluminum as a main component; and an electrically conductive adhesive adhering to the electrically conductive member, the electrically conductive adhesive having a conductive filler mixed therein, wherein the electrically conductive adhesive contains 40% to 50% of the filler in volume ratio to a binder, and wherein the value of resistance between the electrically conductive member and the electrically conductive adhesive after curing is 10 ohms or less.

By employing this embodiment, a conducting path can be provided by way of this electrically conductive adhesive and the adhesion having a low electric resistance can be realized even if the electrically conductive members containing aluminum as a main component are bonded using the electrically conductive adhesive.

To resolve the foregoing problems, a disk drive device according to an embodiment of the present invention includes: a hub, made of an electrically conductive material, which supports a recording disk; a shaft, made of an electrically conductive material, which rotates together with the hub, the shaft being fixed to a rotation center of the hub; a shaft holding member which has a space for housing at least part of the shaft and has a conductor in the at least part thereof; and a base member, made of an electrically conductive material, which supports the shaft holding member, wherein the base member is an electrically conductive member containing aluminum as a main component, wherein the base member and the conductor of the shaft holding member are connected through the medium of an electrically conductive adhesive having a conductive filler mixed therein, wherein the electrically conductive adhesive contains 40% to 50% of the filler in volume ratio to a binder, and wherein the value of resistance between the hub and the base member after curing of the electrically conductive adhesive is 10 ohms or less.

Assume herein that the base member is grounded. According to this embodiment, the base member and the conductor of the shaft holding member are joined together through the medium of the electrically conductive adhesive, and a conducting path can be formed such that the value of resistance between the hub and the base member after curing of the electrically conductive adhesive is 10 ohms or less. As a result, the static charges occurring in the recording disk can be grounded along the path formed by the hub supporting the recording disk, the shaft, the shaft holding member and the base member in this order and therefore the electrostatic charging of a recording disk can be prevented.

To resolve the foregoing problems, an adhesion method according to an embodiment of the present invention includes: applying an electrically conductive adhesive, having a conductive filler mixed therein, to an electrically conductive member containing aluminum as a main component so as to adhere to the electrically conductive member in an electrically conductive manner; and applying a resistance lowering voltage between the electrically conductive member and the electrically conductive adhesive after curing the electrically conductive adhesive so as to reduce a resistance component due to an oxide film formed on a surface of the electrically conductive member.

By employing this embodiment, electrical continuity is assured in a manner such that the resistance lowering voltage is applied to between the electrically conductive member and the electrically conductive adhesive and a dielectric breakdown is caused in the oxide film formed on the surface of the electrically conductive member. An area where the dielectric breakdown occurs is sealed by the electrically conductive adhesive and has no contact with air, so that the oxide film is not formed again and therefore the electrical continuity can be kept continuously.

To resolve the foregoing problems, a method according to an embodiment of the present invention is provided for manufacturing an electrically conductive hub which supports a recording disk, an electrically conductive shaft, fixed to a rotation center of the hub, which rotates together with the hub, a shaft holding member which has a space for housing at least part of the shaft and has a conductor in the at least part thereof, and an electrically conductive base member which supports the shaft holding member. This method includes: applying an electrically conductive adhesive, having a conductive filler mixed therein, to a conductor of the shaft holding member and the electrically conductive base; curing the electrically conductive adhesive; and applying a resistance lowering voltage between the conductor and the electrically conductive base after curing the electrically conductive adhesive so as to reduce a resistance component due to an oxide film formed on a surface of the electrically conductive base member.

Assume herein that the base member is grounded. According to this embodiment, the base member and the conductor of the shaft holding member are joined together through the medium of the electrically conductive adhesive, and electrical continuity is assured in a manner such that the resistance lowering voltage is applied between the conductor and the base member and a dielectric breakdown is caused in the oxide film formed on the surface of the base member. An area where the dielectric breakdown occurs is sealed by the electrically conductive adhesive and has no contact with air, so that the oxide film is not formed again and therefore the electrical continuity can be kept continuously. As a result, the static charges occurring in the recording disk can be grounded along the path formed by the hub supporting the recording disk, the shaft, the shaft holding member and the base member in this order and therefore the electrostatic charging of the recording disk can be prevented.

BRIEF DESCRIPTION OF THE DRAWINGS

Embodiments will now be described by way of examples only, with reference to the accompanying drawings which are meant to be exemplary, not limiting and wherein like elements are numbered alike in several Figures in which.

DETAILED DESCRIPTION OF THE PREFERRED EMBODIMENTS

The invention will now be described by reference to the preferred embodiments. This does not intend to limit the scope of the present invention, but to exemplify the invention.

A description is given hereinbelow of a disk drive device according to the embodiments with reference to the accompanying drawings.

In a disk drive device according to the preferred embodiments of the present invention, electrically conductive members containing aluminum as a main component, e.g., a base plate and a counter plate of the disk drive device, are bonded together using an electrically conductive adhesive (hereinafter referred to simply as "conductive adhesive" also). In an adhesion method employed herein, even when an oxide film has already formed on the surface of the base plate, electrical continuity between the base plate and the counter plate, which are joined together by the medium of the conductive adhesive, is improved by a process of applying a resistance lowering voltage therebetween, which reduces the resistance component due to the oxide film by causing a dielectric breakdown in the oxide film.

Figure 1:
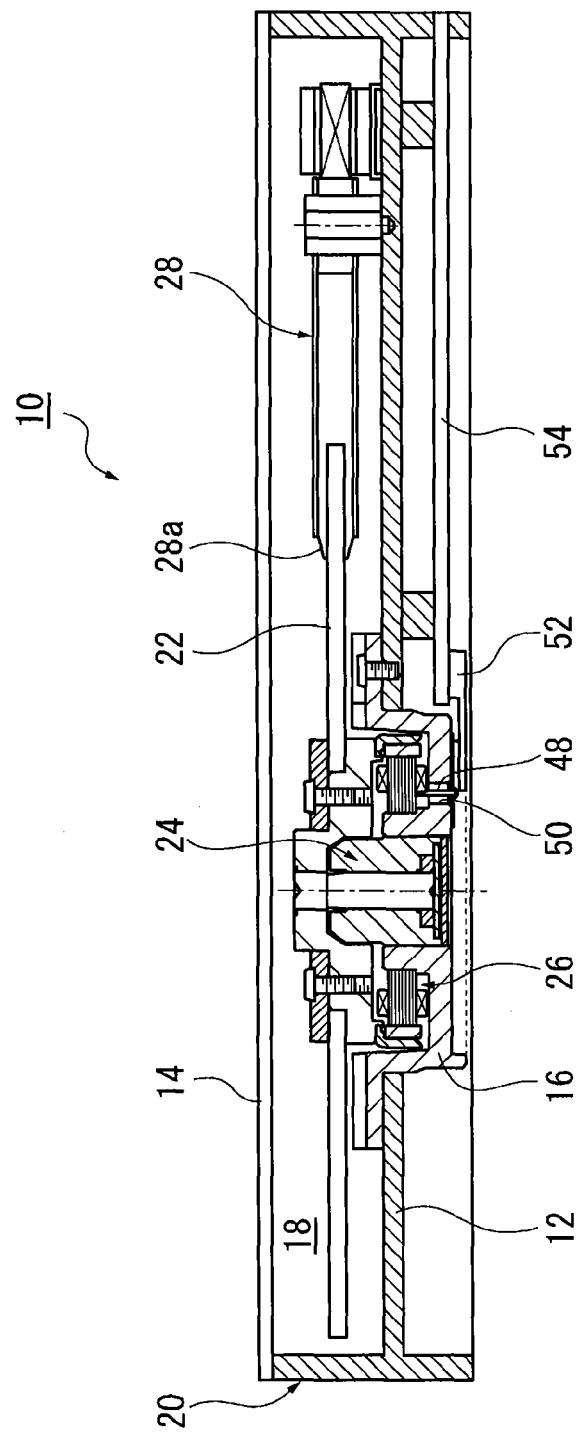
FIG. 1 is a schematic cross-sectional view for explaining a general structure of a disk drive device to which an adhesion structure according to an embodiment is applicable.

FIG. 1 is a schematic cross-sectional view for explaining a general structure of a disk drive device 10 according to an embodiment.

The disk drive device 10 includes a chassis 12, which is formed of a metal, such as aluminum, in an approximately concave cross section, a cover 14, which is, for instance, a metal cover covering a recessed part of the chassis 12, and a housing 20, which has an enclosed space 18 formed by a base plate 16 serving as the base for a bearing unit to be discussed later. Inside the enclosed space 18 of the housing 20, a recording disk 22, which is a magnetic recording medium, is rotatably supported by a bearing unit 24. And coupled to the bearing unit 24 is a drive unit 26, which drives the rotation of the recording disk 22. Also, disposed inside the housing 20 is a head unit 28, which performs write and read of data to and from the recording disk 22 with a magnetic head 28a swinging in a radial direction of the revolving recording disk 22.

Figure 2:
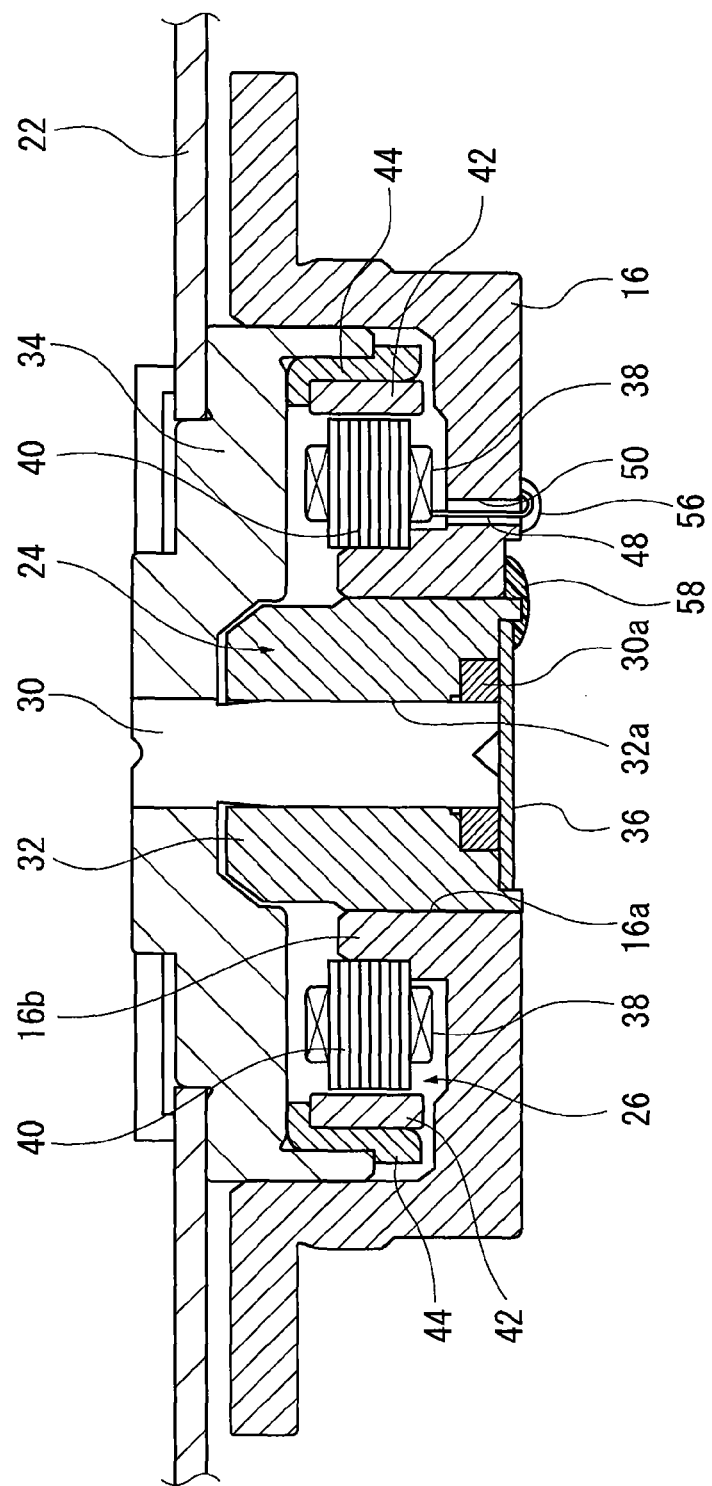
FIG. 2 is a schematic enlarged cross-sectional view showing a bearing unit and a drive unit disposed inside a housing to which an adhesion structure according to an embodiment is applicable.

FIG. 2 is a schematic enlarged cross-sectional view showing a bearing unit 24 and a drive unit 26 disposed inside a housing 20.

The bearing unit 24 includes a shaft 30, a sleeve 32, a hub 34, and a counter plate 36. For the present embodiment, a description will be given of an example in which a shaft holding member is formed by the sleeve 32 and the counter plate 36. In this embodiment, the hub 34 and the base plate 16 are made of an electrically conductive material containing aluminum or the like as a main component. The shaft 30 is made of an electrically conductive material such as stainless steel or the like. The sleeve 32 is made of an electrically conductive material such as brass or the like. It is to be noted, however, that the sleeve 32, if it includes a part serving as a conducting path to the exterior, should not necessarily be made of a conductive material in its entirety but of a resin or the like.

The base plate 16, which constitutes a part of the housing 20, has a circular opening 16a. The substantially cylindrical sleeve 32 is fitted in the circular opening 16a. The sleeve 32, as shown in FIG. 2, is inserted into the circular opening 16a in a state of clearance fit so as to avoid any deformation resulting from external forces working then and is bonded to the internal wall surface of the circular opening 16a with an adhesive or the like. The shaft 30, having the hub 34 fixed at one end and a flange 30a for generating a dynamic pressure at the other end, is held rotatably in the circular opening 32a of the sleeve 32. Note that the circular opening 32a of the sleeve 32 is sealed by the counter plate 36 not only to prevent the falling-off of the shaft 30 but also to maintain the airtightness of the enclosed space 18. The hub 34 has the recording disk 22 fixed thereto.

A stator core 40 wound with coils 38 for producing magnetism is fixed on an outer side of a cylindrical wall 16b defining the circular opening 16a of the base plate 16. Also, on the hub 34 fixed to the shaft 30, a rotor yoke 44 for supporting a magnet 42 is fixed in such a manner that the stator core 40 and the magnet 42 face each other. The stator core 40 and the magnet 42, which face each other with a little gap in between, can cause the hub 34 to rotate as currents according to the rotational position of the magnet 42 are delivered through the coils 38. That is, the magnet 42, the rotor yoke 44, the hub 34, and the shaft 30 function as a rotor, causing the recording disk 22 to rotate at a predetermined speed in a predetermined direction.

Note that the bearing unit 24 used in the present embodiment, which is a so-called dynamic pressure bearing, has the flange 30a disposed, for instance, at an end of the shaft 30 as mentioned already. A space enclosed by the shaft 30, the flange 30a, the sleeve 32 and the counter plate 36 is filled with a lubricant. Also, at least in either of the inner circumferential surface of the sleeve 32 and the outer circumferential surface of the shaft 30, a herringbone groove is provided in a plurality of parts axially separate from each other to form a radial dynamic-pressure bearing unit. Similarly, a herringbone groove is provided at least in either of a face of the flange 30a and the end face of the sleeve 32 opposite thereto and at least in either of the other face of the flange 30a and the face of the counter plate 36 opposite thereto, thereby forming a thrust dynamic-pressure bearing unit. Thus, as the flange 30a rotates together with the shaft 30, there occur portions with higher pressures in the lubricant. And the pressures (dynamic pressure) work in such a manner as to move the shaft 30 and the flange 30a away from the surrounding wall surfaces, so that the shaft 30 can rotate in a substantially non-contact manner. As a result, the recording disk 22 can rotate stably at high speed, and the write or read of data can be performed at a stabilized manner as well.

Provided in a part of the base plate 16 is a through-hole 50 through which a leader wire 48 from the coil 38 is led out to the exterior of the base plate 16. The leader wire 48 led out from the through hole 50 is connected to a circuit board 54 via a connector 52 and is used for power supply and transmission of signals as required. It is also to be noted that the through-hole 50 is sealed with a sealing member 56 of resin or the like so as to keep the space airtight on the inside of the base plate 16, that is, on the side of the enclosed space 18 of the housing 20.

Now, a description will be given of an example of an assembly procedure for the bearing unit 24 and the drive unit 26 of a disk drive device 10 as described above. First, a shaft 30 with a flange 30a fixed thereto is inserted into a sleeve 32. Then the circular opening 32a of the sleeve 32 on the larger-diameter side is covered with a counter plate 36, and at the same time lubricant is introduced into the circular opening 32a of the sleeve 32 holding the shaft 30, thus preparing the dynamic pressure bearing portion of the bearing unit 24. Next, a rotor portion is prepared by bonding a rotor yoke 44 with magnetized magnets 42 fixed thereto to a hub 34 in the yoke mounting position with an adhesive. Also, a stator portion with a stator core 40 wound with coils 38 bonded to the outer side of a cylindrical wall 16b of a base plate 16 is prepared. Then a hub 34, which has been attached as part of the rotor portion, is press-fitted to the top end portion of the shaft 30, and the sleeve 32 and the base plate 16 are assembled with each other with a coat of thermoset adhesive applied to the joint portion. Finally, heated curing is done to accomplish an adhesive bonding of the rotor portion and the stator portion.

As discussed earlier, the disk drive device 10 must be provided with conducting paths that can release static charges in the recording disk 22 to the base plate 16 that is grounded. The hub 34 supporting the recording disk 22, the shaft 30 supporting the hub 34, and the counter plate 36 with which the shaft 30 can be in contact are all electrically conductive. Therefore, for example, when the shaft 30, which is part of the rotor portion, is not rotating, the shaft 30 or the flange 30a, if it comes into contact with the counter plate 36, can easily provide a conducting path from the recording disk 22 to the counter plate 36.

Note here that the adhesive used for joining the sleeve 32 and the base plate 16 together is often an epoxy adhesive that exhibits high bonding strength. Yet, the adhesive in this particular joint portion can function as an insulating material. In the present embodiment, therefore, an electrically conductive adhesive 58 is applied to this portion in order to provide a conducting path between the counter plate 36 and the base plate 16. The electrically conductive adhesive 58 is an organic adhesive with conductor particles mixed in. The organic adhesive normally used is an epoxy resin, which is chemically stable after curing and also features relatively high heatproof temperature. The conductor normally used as a filler is silver, which is not oxidized easily and has low electric resistance. And electrical continuity is assured as the contact between the conductive filler particles themselves and between the conductive filler particles and the surface of the adherend becomes closer as a result of curing shrinkage of the epoxy resin. Note that the filler to be used is preferably in flake form to increase the contact area between the filler particles themselves and between the filler and the adherend.

With a disk drive device 10 according to the present embodiment, the base plate 16 is an aluminum die casting, the sleeve 32 is brass plated with nickel, and the counter plate 36 is of a stainless steel. Hence, the conductive adhesive 58 is applied in such a manner as to spread over the metal surfaces of the base plate 16 and the counter plate 36 and the plated surface of the sleeve 32. In the present embodiment, the conductive adhesive to be used is an epoxy resin mixed with flaky silver particles at a content percentage of silver being 80% to 85% in weight ratio, and the quantity of application is 3.5 milligrams (mg) per device. The curing of the epoxy component is accomplished by leaving the disk drive device 10 for two hours at an ambient temperature of 85° C. after the application of the conductive adhesive 58 thereto.

With electrical continuity established as described above through the three components of the base plate 16, the sleeve 32 and the counter plate 36, a mechanism for releasing static charges in the recording disk 22 into the chassis 12 (see FIG. 1) after passing through the hub 34, the shaft 30, the flange 30a, the counter plate 36, the conductive adhesive 58 and the base plate 16 is created when the rotation of the recording disk 22 is stopped in the disk drive device 10 installed with the hub 34 in the upper position. On the other hand, when the disk drive device 10 is installed with the hub 34 in the lower position, a mechanism for releasing static charges in the recording disk 22 into the chassis 12 after passing through the hub 34, the shaft 30, the flange 30a, the sleeve 32, the conductive adhesive 58 and the base plate 16 is created when the rotation of the recording disk 22 is stopped.

Figure 3:
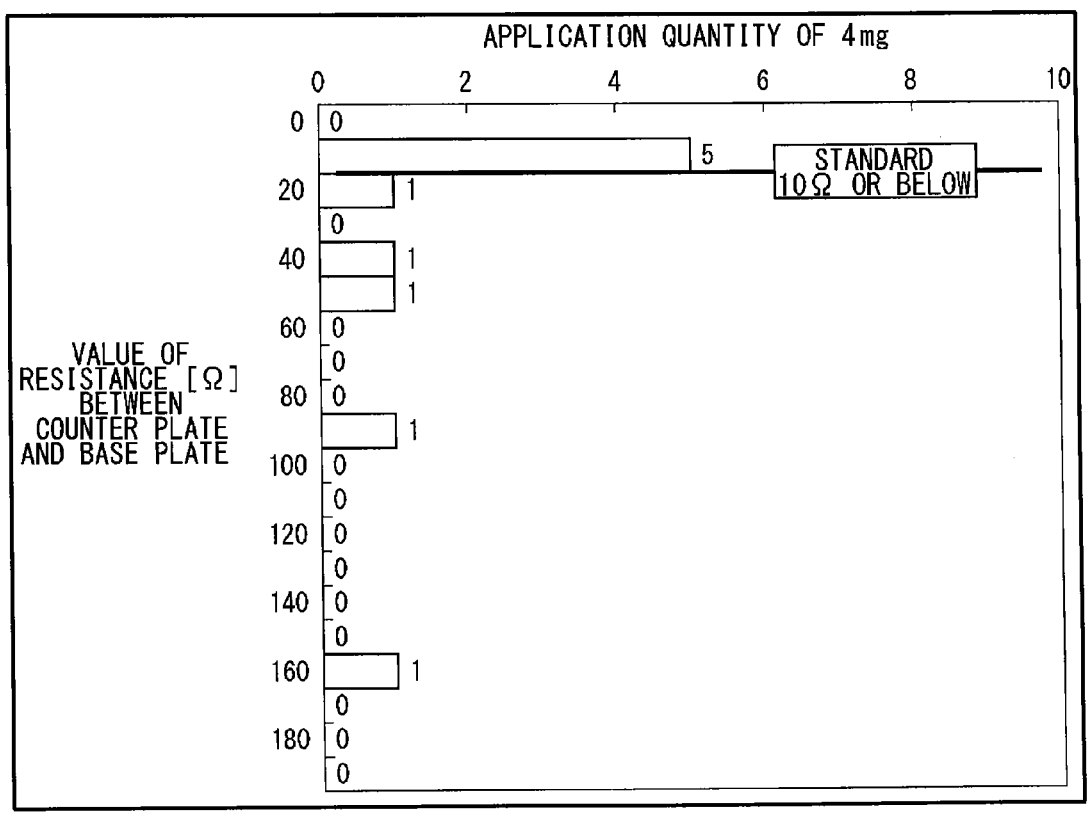
FIG. 3 is provided for explaining the fact that there are variations in resistance values between a counter plate and a base plate.

In the process of the present embodiment, however, the inventors have recognized that even in the disk drive device 10 assembled as described above there are variations in resistance value along the path from the hub 34 to the base plate 16. Thus they have measured variations in resistance value between the component members. As a result, it has been confirmed that, as shown in FIG. 3, there is a major variation in resistance value between the counter plate 36 and the base plate 16, in contrast to the other components, and the discharge of static electricity is not adequate with certain product units. That is, the inventors have recognized that there exist quality variations, i.e., variations in the capacity for static discharge, among the product units that have gone through the same manufacturing process.

With rapid increases in recording density in recent years, the magnetic head 28a as used in the disk drive device 10 uses a head having a reduced gap of an electric shield and a magnetically complicated structure. As a consequence, there have been more problems of damage to the magnetic head 28a due to static electricity. As previously described, in such a disk drive device 10, electrostatic charging can occur on the surface of the recording disk 22, which rotates at high speed in air. One route for grounding the static charges in the recording disk 22 is from the recording disk 22 to the hub 34, the shaft 30, then to the sleeve 32 or the counter plate 36, and to the base plate 16 and the chassis 12. Another route is from the recording disk 22 to the head unit 28 and the chassis 12. Normally, when the recording disk 22 is rotating, the magnetic head 28a is lifted by about 10 nanometers, and there exists an electric resistance of several tens to several hundred megaohms between the recording disk 22 and the magnetic head 28a. Thus, static electricity is grounded to the chassis 12 by way of the shaft 30. In this case, electric currents flow through this route even when the electric resistance between the shaft 30 and the hub 34 or the counter plate 36 is only several kilo-ohms. Consequently, no excess current will flow to the magnetic head 28a and therefore no electrostatic discharge failure of the magnetic head 28a will occur.

On the other hand, when the recording disk 22 is stationary, the magnetic head 28a is in close contact with the recording disk 22, and therefore the electric resistance between the magnetic head 28a and the recording disk 22 is several tens to several hundred ohms. In this case, when the electric resistance between the hub 34, the shaft 30, the sleeve 32 or the counter plate 36, and the base plate 16 becomes several kilo-ohms, the static charges in the recording disk 22 are grounded by way of the magnetic head 28a. This causes an excess current to flow to the magnetic head 28a, thus raising the risk of an electrostatic discharge failure of the magnetic head 28a. The inventors have therefore realized that it is desirable for greater reliability of the disk drive device 10 to set the electric resistance between the hub 34, the shaft 30, the sleeve 32 or the counter plate 36, and the base plate 16 to 10 ohms or below.

Since it is possible to ensure a direct continuity through the components in contact with each other from the hub 34 to the counter plate 36, the inventors have concluded that the discharge of static electricity can be accomplished satisfactorily if the resistance between the sleeve 32 or the counter plate 36 and the base plate 16 is held as low as 10 ohms or below.

Figure 4A:
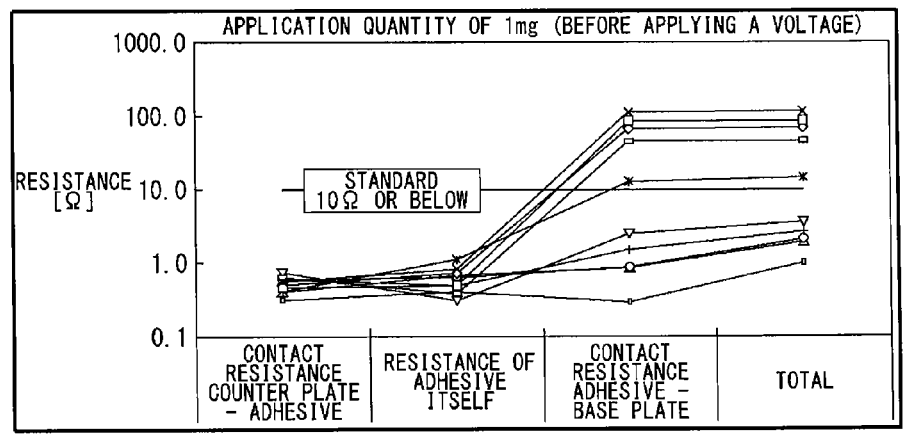
FIGS. 4A to 4C are provided for explaining differences in resistance values among a counter plate, a base plate and an electrically conductive adhesive.
Figure 4B:
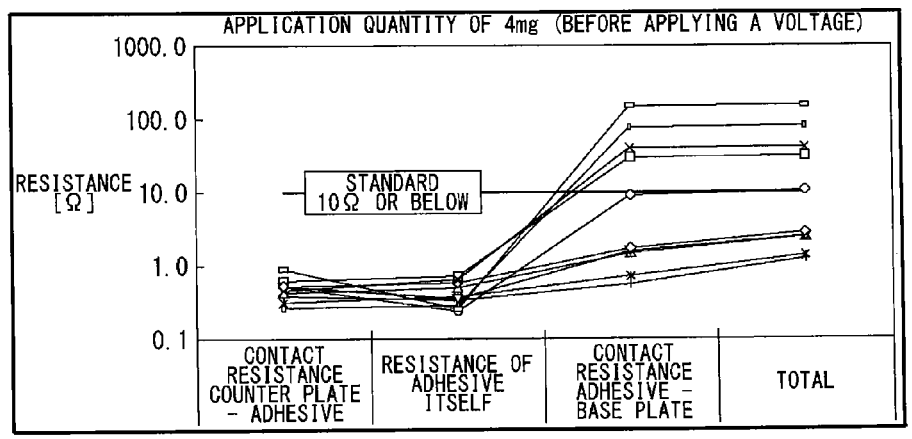
Figure 4C:
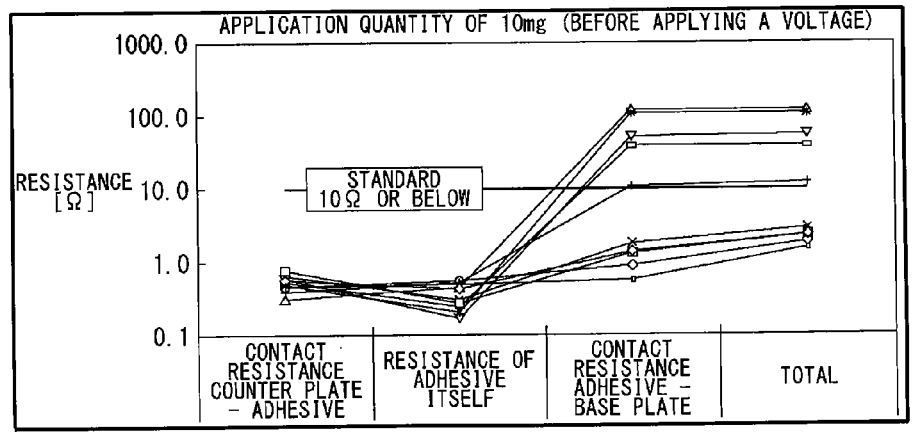

In the course of due diligence investigations by the inventors, the resistance values among the counter plate 36, the base plate 16 and the conductive adhesive 58 are checked to verify in detail the resistance value between the sleeve 32 or the counter plate 36 and the base plate 16. The results are shown in FIGS. 4A to 4C. In the manufacturing of the disk drive devices 10, the application quantity of the conductive adhesive 58 applied to between the counter plate 36 and the base plate 16 is 3 to 5 mg, for instance. If the application quantity thereof falls below 3 mg, it becomes difficult to connect the counter plate 36 and the base plate 16 with adhesives; if the required application quantity thereof is too much, there will be no advantages using the adhesive in terms of cost. An experiment according to the present embodiment is conducted under the condition of a range that exceeds the amount used normally. FIG. 4A is a case when 1 mg of conductive adhesive 58 is applied; FIG. 4B is a case when 4 mg thereof is applied; and FIG. 4C is a case when 10 mg thereof is applied. The resistance values are measured between the counter plate 36 containing a part of the sleeve 32 and the conductive adhesive 58 after curing, in the conductive adhesive 58 only, and between the conductive adhesive 58 after curing and the base plate 16, respectively.

As shown in FIGS. 4A to 4C, it is found that the resistance value of the conductive adhesive 58 alone and the value of resistance between the conductive adhesive 58 and the counter plate 36 containing a part of the sleeve 32 are relatively low and the variations are small irrespective of the application quantity of the conductive adhesive 58 used. On the other hand, it is obvious from FIGS. 4A to 4C that the variations in the values of resistance between the conductive adhesive 58 and the base plate 16 are large. That is, it is found that the total variation in the values of resistance gets large on account of the values of resistance between the conducive adhesive 58 and the base plate 16.

Now, those having a larger resistance value are observed. Since in appearance the conductive adhesive 58 firmly adheres to the base plate 16, it may be inferred that the oxide film formed on aluminum which constitutes the material of the base plate 16 interferes with the electrical continuity on the surface of the base plate 16 and therefore the oxide film causes increased variations in resistance value.

The inventors have sought and attempted various methods for removing the oxide film formed on the surface of the base plate 16 or alleviating the effect of the oxide film thereon. As a result, they have found out that the electrical continuity can be improved by causing the dielectric breakdown in the oxide film formed on the surface of the base plate 16 in such a manner that after the curing of the conductive adhesive 58, a voltage is applied to between the counter plate 36 and the base plate 16 and thereby a current passing through the conductive adhesive 58 is delivered thereto.

Figure 5A:
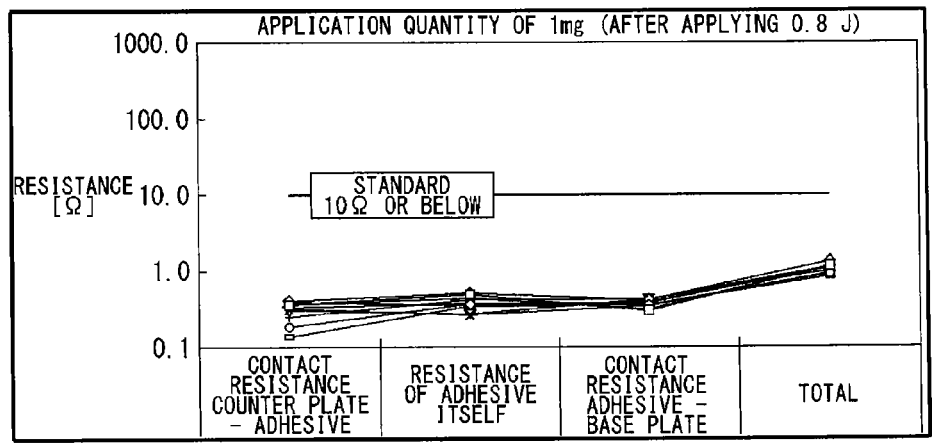
FIGS. 5A to 5C are provided for explaining differences in resistance values among a counter plate, a base plate and an electrically conductive adhesive on which a resistance lowering processing according to an embodiment of the present invention has been performed.
Figure 5B:
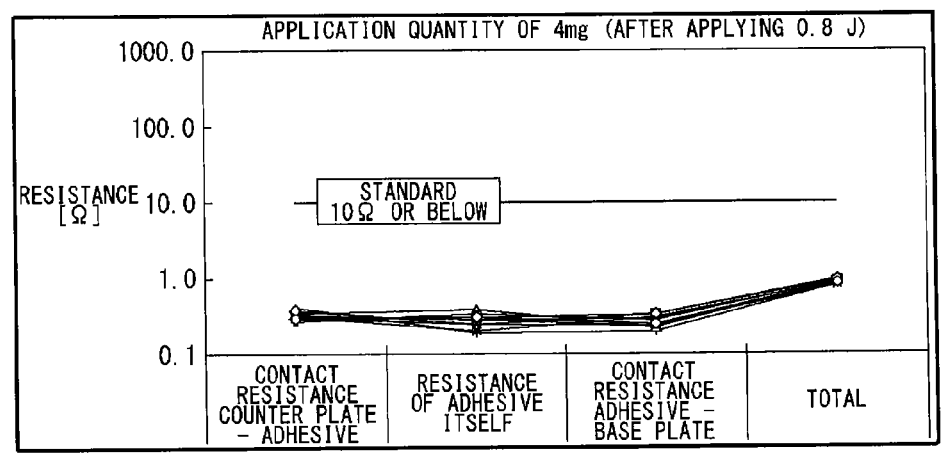
Figure 5C:
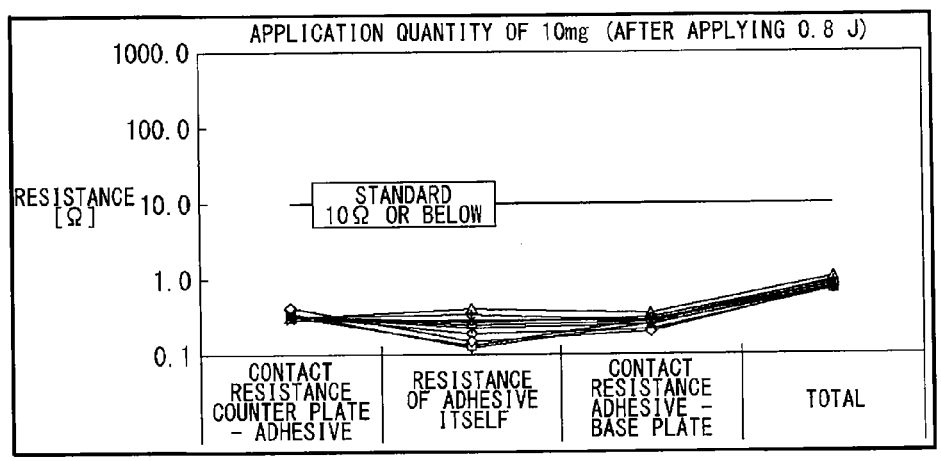

FIGS. 5A to 5C illustrate a change of resistance values when a voltage is applied to between the counter plate 36 and the base plate 16. In FIGS. 5A to 5C, similar to FIGS. 4A to 4C, the application quantities of the conductive adhesive 58 applied to between the counter plate 36 and the base plate 16 are 1 to 10 mg. That is, FIG. 5A is a case when 1 mg of conductive adhesive 58 is applied; FIG. 5B is a case when 4 mg thereof is applied; and FIG. 5C is a case when 10 mg thereof is applied. The resistance values are measured between the counter plate 36 containing a part of the sleeve 32 and the conductive adhesive 58 after curing, in the conductive adhesive 58 only, and between the conductive adhesive 58 after curing and the base plate 16, respectively.

As shown in FIGS. 5A to 5C, it is found that the value of resistance between the conductive adhesive 58 and the base plate 16 is lowered by applying a voltage and delivering a current thereto and, besides, the variation gets small. It is also found that the resistance values are invariant irrespective of the application quantity of the conductive adhesive 58 used. Thus, it can be said that the voltage applied then is the resistance lowering voltage that reduces the resistance component due to the oxide film formed on the surface of the base plate 16.

Figure 6:
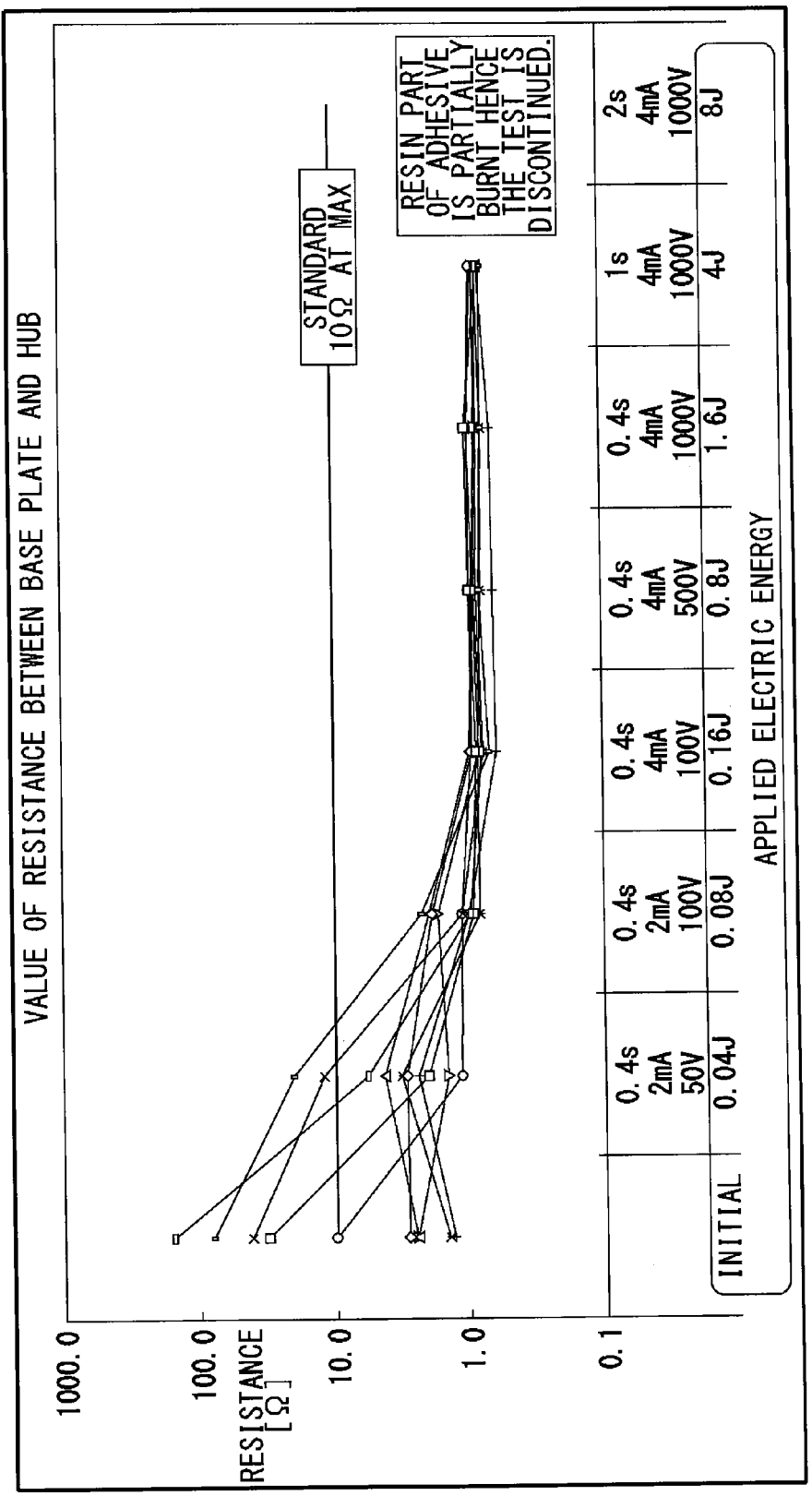
FIG. 6 is provided for explaining a change in resistance values when the electric energy by applying a resistance lowering voltage is varied in a resistance lowering processing according to an embodiment of the present invention.

FIG. 6 illustrates a change in resistance values when the electric energy by applying the resistance lowering voltage is varied. FIG. 6 shows resistance values measure when 4 mg of conductive adhesive 58 is applied to between the counter plate 36 and the base plate 16 and is cured and then various values of resistance lowering voltages are applied to between the counter plate 36 and the base plate 16. Since, as described above, the conductive adhesive member can be in direct contact with and also between the hub 34, shaft 30 and counter plate 36 (or sleeve 32), the values of resistance there are not high and do not vary. FIG. 6 therefore shows a measurement result of a change in resistance values between the hub 34 supporting the recording disk 22 and the base plate 16 after the resistance lowering voltage is applied to between the counter plate 36 and the base plate 16.

FIG. 6 shows resistance values before the application of resistance lowering voltage, and those resulting after the resistance lowering voltages are applied when the electric energies of 0.04 J, 0.08 J, 0.16 J, 0.8 J, 1.6 J, 4 J, and 8 J are supplied. Referring to FIG. 6, if the electric energy as a result of the application of resistance lowering voltage is 0.08 J or above, the resistance component due to the oxide film can be reduced and the variations in resistance values can be reduced. Up to a point where the electric energy by the application of resistance lowering voltage is about 4 J, the conductive adhesive 58 is not burnt out, so that the resistance component due to the oxide film can be reduced and the variations in resistance values can be reduced.

As a best example of the present embodiment, 3.5 mg of conductive adhesive 58 that contains 3 mg of silver filler is applied to between the counter plate 36 and the base plate 16, for instance, and is cured at a temperature of 85° C. for two hours. When the resistance lowering voltage is not applied, the values of resistance between the base plate 16 and the counter plate 36 are in a range of 1 to 200 ohms as shown in FIG. 3 and therefore there are large variations. In the light of this, the resistance lowering voltage is applied so as to carry out a resistance lowering processing. Specifically, 500 V×4 mA (regulated by a current limiter) is applied for 0.4 seconds by the use of an insulation resistance tester so as to supply an electric energy of 0.8 J.

Figure 7:
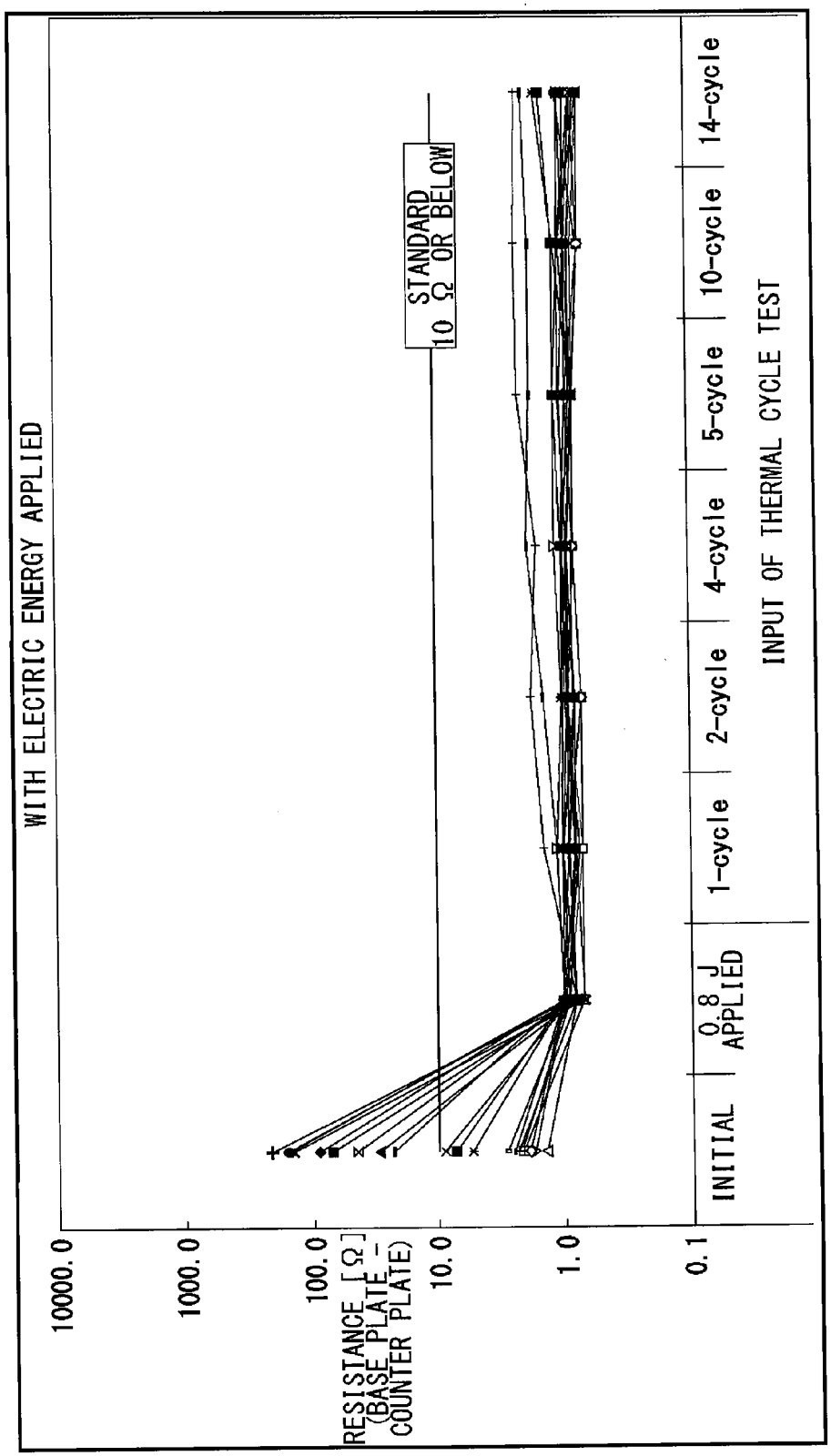
FIG. 7 is provided for explaining a result measured when a disk drive device on which a resistance lowering processing according to an embodiment of the present invention has been performed is subjected to a reliability test.

FIG. 7 shows a result obtained after the disk drive device 10 on which the resistance lowering processing has been performed is subjected to a thermal cycle test. In this thermal cycle test, a low temperature exposure (−45° C., 1 hour), a normal temperature exposure (25° C., 30 minutes), a high temperature exposure (85° C., 1 hour) and a normal temperature exposure (25° C., 30 minutes), for example, are set to one cycle, and then this cycle is repeated so as to observe the temporal change in properties of the then disk drive device 10. In the case of the present embodiment, the change in the values of resistance between the base plate 16 and the counter plate 36, for example, of the disk drive device 10 is measured per cycle. As a result, referring to FIG. 7, no temporal change in properties of the disk drive device 10 is observed in the thermal cycle test. In other words, it is speculated that the area where the dielectric breakdown occurs in the base plate 16 as a result of the resistance lowing processing remains as a low-resistance conducing path between the base plate 16 and the counter plate 36 because the area is sealed by the conductive adhesive 58 and therefore the exposure to the air is prevented and the oxide film is not formed again.

In the present embodiment, the conductive adhesive 58 to be used is an epoxy resin, serving as a binder, mixed with silver particles as a flaky filler at a content percentage of silver being 80% to 85% in weight ratio. In such a case, the volume ratio of the silver particles to the epoxy resin is 40% to 50%, so that a sufficient adhesion power is achieved after the curing. The conductive adhesive 58 is so applied as to connect the base plate 16 and the counter plate 36 and is cured and then the resistance lowering processing is performed thereon. As a result, the value of resistance therebetween indicates 10 ohms or below, for instance. In this case, the conductive adhesive 58 may be any material whose resistance value between the conductive adhesive 58 and the base plate 16 is 10 ohms or below after the resistance lowering processing; for example, gold, copper, nickel, palladium, carbon or the like may be used as the filler. In such a case, the weight ratio varies depending on the specific gravity of the filler. As described above, however, as long as the volume ratio of the filler to the epoxy resin in the conductive adhesive 58 is 40% to 50%, the dielectric breakdown of the oxide film can be caused by the resistance lowering processing and therefore the sufficient adhesion power can be assured.

As described above, by employing the present embodiment, the dielectric breakdown is induced in the oxide film formed on the surface of adherend such as the base plate 16 by simply applying the resistance lowering voltage after the curing of the conducting adhesive. This can reduce the resistance value. This simple method is also applicable to the regions where the pressure cannot be applied during the curing, and can reduce the resistance values thereof. Since no superfluous components needs to be added to the conductive adhesive, the curing performance is not affected and the occurrence of outgassing does not increase. Also, a specially designed large-scale equipment is not required to assure the electrical continuity.

The fillers contained in the conductive adhesive do not flow after the oxide film formed on the surface of the adherend has been removed, so that fillers are fixed in the positions where the dielectric breakdown occurs in the oxide film of the adherend and therefore a low resistance can be stably maintained.

Further, in the disk drive device 10 according to the present embodiment, any mechanical deformation of the parts involved and excessive heating are not required for the adhesion, the reduction in resistance values and the stabilization of electrical continuity. Thus, electrical continuity between the sleeve and the base plate can be assured without causing deterioration in dimensional accuracy. As a result, while the data recording density of the recording disk is high, the mechanism for releasing static charges accumulated on the recording disk to a chassis side can be easily created. Also, the magnetic head for reading and writing data and the data recorded on the recording disk can be protected against being damaged or destroyed by static charges.

Since in a process of assuring the electrical continuity by dielectric breakdown of the oxide film the disk drive device is free from dirt and no outgassing occurs, even after the processing, in areas where electrical continuity is to be established, the data and the magnetic disk can be protected against being damaged.

With increases in recording density of the recording disk, the flying height of the magnetic head from the recording disk gets smaller and smaller and the electric resistance between the magnetic head and the recording disk tends to drop in the future. Thus the magnetic head is expected to be of a structure such that the magnetic head is more susceptible to the effect of static charges. By employing the adhesion structure, the adhesion method, the disk drive device and the method for manufacturing the disk drive device according to the present embodiment, stable low-resistance electrical continuity can be easily assured, so that they are also suitable for such a future structure.

Also, the assurance of stable electrical continuity contributes to reducing the level of defectiveness during a manufacturing process, so that productive disk drive devices can be efficiently manufactured at low cost.

In the present embodiment, the disk drive device 10 is shown as one example of adhesion structures where an electrically conductive adhesive having a conductive filler mixed therein adheres to an electrically conductive member containing aluminum as a main component. However, this should not be considered as limiting and the resistance lowering processing according to the present embodiment may be applicable to any case where the conductive adhesive is applied to the regions where the oxide film exists, and thereby the similar advantageous effects can also be achieved.

In the present embodiment, a type of structure where the shaft, which constitutes part of the rotor, rotates is shown as one example of the disk drive device 10. However, the present embodiment is also applicable to a type of disk drive device where the shaft is fixed to a base plate side and the sleeve rotates around the shaft, thereby the similar advantageous effects can also be achieved.

The present invention is not limited to the above-described embodiments only, and it is understood by those skilled in the art that changes in design may be added to the embodiments based on their knowledge and the embodiments added with such modifications are also within the scope of the present invention. The structure shown for each Figure is for illustrative purposes only and may be changed, as appropriate, as long as the similar functions can be attained and the similar advantageous effects can also be achieved.

We claim:

1. A disk drive device including:
a hub, made of an electrically conductive material, which supports a recording disk;
a bearing unit configured to rotatably support the hub and having electrical continuity when a rotation of the hub is stopped;
a magnetic head configure to write and read data in the recording disk;
a base member configured to support the bearing unit, the base member being made of a material containing aluminum as a main component and the base member having an oxide film thereon, an area of the oxide film on said base member being subject to dielectric breakdown, and the bearing unit and the base member being electrically connected by an electrically conductive adhesive adhered to the bearing unit and the area of said oxide film on the base member subject to dielectric breakdown, the electrically conductive adhesive having a conductive filler mixed therein;
wherein the area of the oxide film on the base member subject to dielectric breakdown is sealed by the electrically conductive adhesive, and
wherein an electrical contact resistance between the electrically conductive adhesive and the base member is 10 ohms or less.

2. The disk drive device according to claim 1,
wherein an electrical resistance between the hub and the base member is smaller than an electric contact resistance between the magnetic head and the recording disk occurring when the rotation of the hub is stopped.

3. The disk drive device according to claim 1,
wherein the conductive filler is mixed in the electrically conductive adhesive at a percentage of 80% to 85% in weight ratio.

4. The disk drive device according to claim 1,
wherein the electrically conductive adhesive applying is in an amount 1 mg to 10 mg.

5. The disk drive device according to claim 1,
wherein the bearing unit is a dynamic pressure bearing.

6. A disk drive device including:
a hub, made of an electrically conductive material, which supports a recording disk;

a bearing unit configured to rotatably support the hub and having electrical continuity when a rotation of the hub is stopped;

a magnetic head configure to write and read data in the recording disk;

a base member configured to support the bearing unit, the base member being made of a material containing aluminum as a main component and the base member having an oxide film thereon, an area of the oxide film on said base member being subject to dielectric breakdown, and the bearing unit and the base member being electrically connected by an electrically conductive adhesive adhered to the bearing unit and the area of said oxide film on the base member subject to dielectric breakdown, the electrically conductive adhesive having a conductive filler mixed therein;

wherein the conductive filler is mixed in the electrically conductive adhesive at a percentage of 80% to 85% in weight ratio, wherein an electrical contact resistance between the electrically conductive adhesive and the base member is 10 ohms or less.

7. The disk drive device according to claim 6, wherein an electrical resistance between the hub and the base member is smaller than an electric contact resistance between the magnetic head and the recording disk occurring when the rotation of the hub is stopped.

8. The disk drive device according to claim 6, wherein the electrically conductive adhesive applying is in the amount 1 mg to 10 mg.

9. The disk drive device according to claim 6, wherein the bearing unit is a dynamic pressure bearing.

\* \* \* \* \*